United States Patent [19]
Williams et al.

[11] Patent Number: 5,311,378
[45] Date of Patent: May 10, 1994

[54] DUAL VERY-HIGH DENSITY MAGNETIC HEAD ASSEMBLY WITH OPTICAL SERVO POSITIONING FOR VERY HIGH DENSITY FLOPPY DISK RECORDING AND HIGH DENSITY FORMAT COMPATABILITY

[75] Inventors: Roger O. Williams, Fremont; Stephen P. Williams, Morgan Hill; Duane G. Wallace, Jr., San Jose, all of Calif.

[73] Assignee: Insite Peripherals, Inc., San Jose, Calif.

[21] Appl. No.: 878,551

[22] Filed: May 5, 1992

[51] Int. Cl.$^5$ .................. G11B 13/00; G11B 5/596
[52] U.S. Cl. .................. 360/77.03; 360/78.05; 360/78.11; 360/103; 360/104; 369/14
[58] Field of Search .......... 369/13, 14, 15; 360/48, 360/77.03, 78.11, 78.05, 102–104, 107, 110, 114, 121, 135

[56] References Cited

U.S. PATENT DOCUMENTS

| | | | |
|---|---|---|---|
| 4,570,191 | 2/1986 | DiStefano et al. | 360/77.03 |
| 4,633,451 | 12/1986 | Ahn et al. | 369/14 |
| 4,816,939 | 3/1989 | Ford et al. | 360/77.03 |
| 4,843,494 | 6/1989 | Cronin et al. | 360/77.03 |
| 4,933,795 | 6/1991 | Nigam | 360/121 |
| 4,935,835 | 6/1990 | Godwin et al. | 360/135 |
| 4,987,505 | 1/1991 | Iwabuchi et al. | 360/103 |
| 4,996,615 | 2/1991 | Iwanaga | 360/104 |

FOREIGN PATENT DOCUMENTS 275747 7/1988 European Pat. Off. .............. 369/14

Primary Examiner—Long T. Nguyen
Assistant Examiner—Steven R. Garland
Attorney, Agent, or Firm—Thomas E. Schatzel

[57] ABSTRACT

A disk system comprising an upper and lower head gimbal assembly, a coarse positioning servo system that includes a stepper motor for 135 TPI operation and a voice coil motor type servo for 1251 TPI operation that is driven by a optical servo system which locates optical track positioning information previously recorded on 3.5 inch microfloppies. The optical system focuses a spot of infrared light on the microfloppy which is channeled back to a detector. Each head gimbal includes a ceramic slider with two air bearing surfaces. A very high density magnetic core is positioned in one air bearing surface and high density magnetic core is located in the other air bearing surface. Both upper and lower sliders are such that the floppy disk media is pinched between them. The gaps of the magnetic cores are positioned within the leading edge half of their respective air bearing surfaces and take advantage of the tendency of the sliders to plow into the floppy disk media. The very high density and high density cores are offset differently from the centerline of the sliders to reduce crosstalk coupling between heads on opposite sides of the floppy disk media.

4 Claims, 8 Drawing Sheets

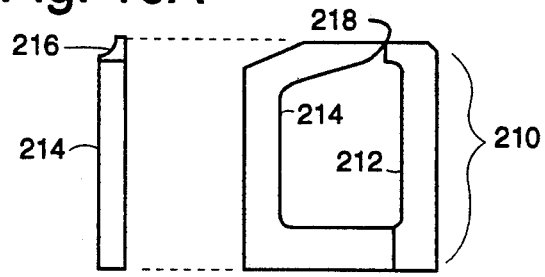
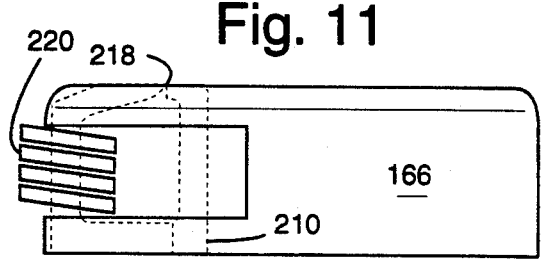
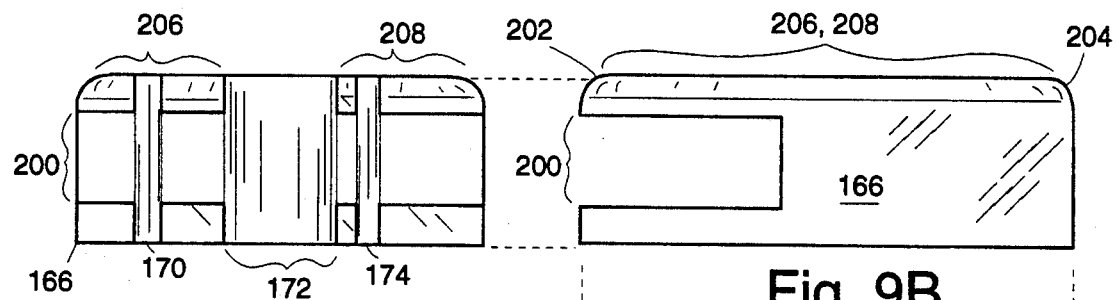
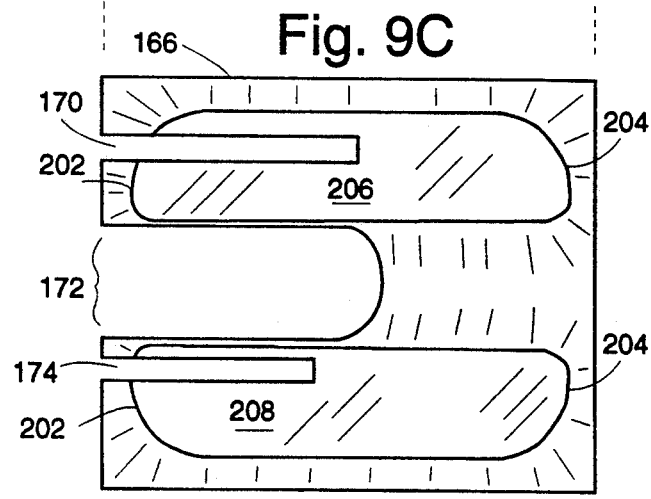

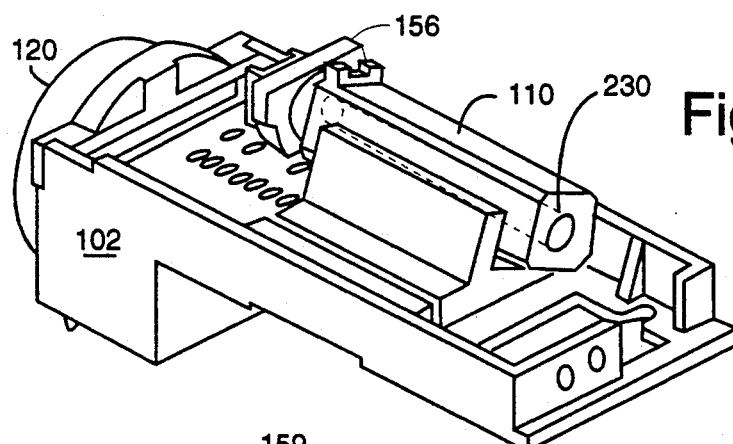
Fig. 12A
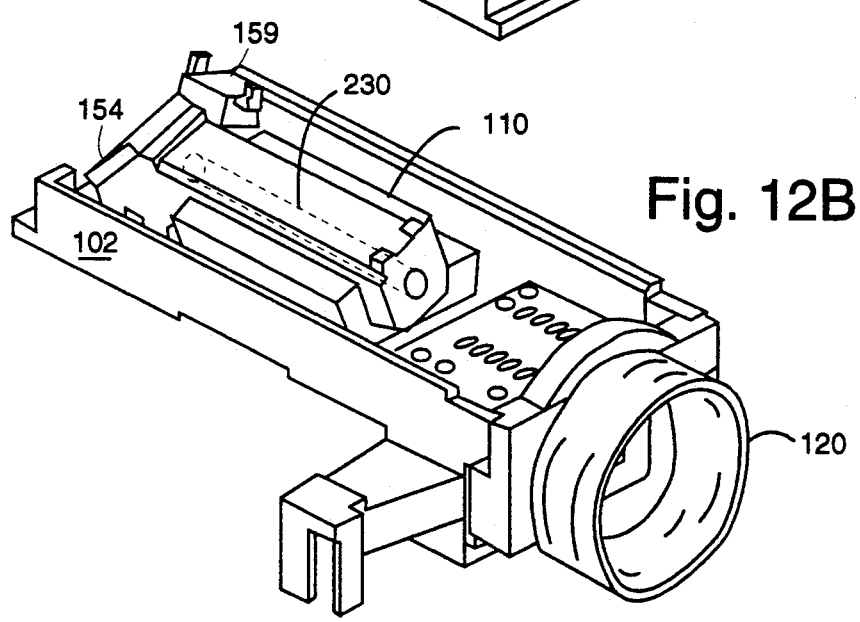
Fig. 12B
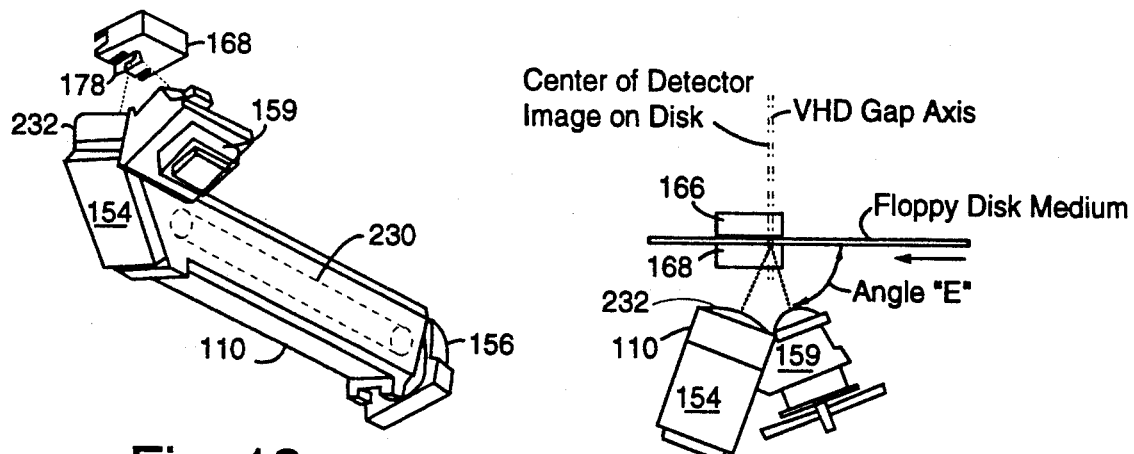
Fig. 13
Fig. 14

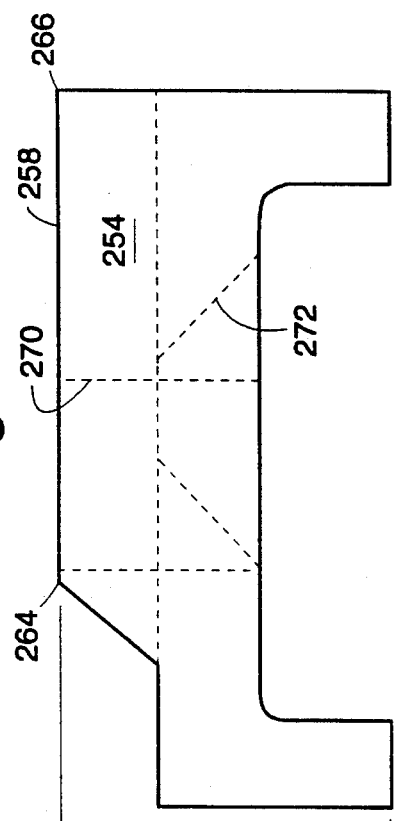
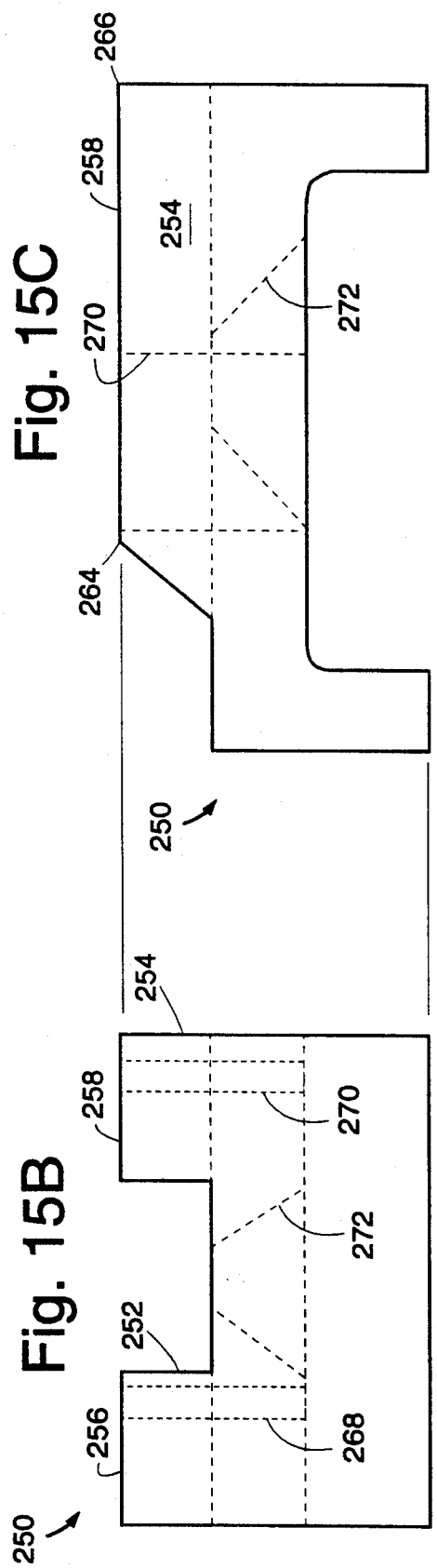
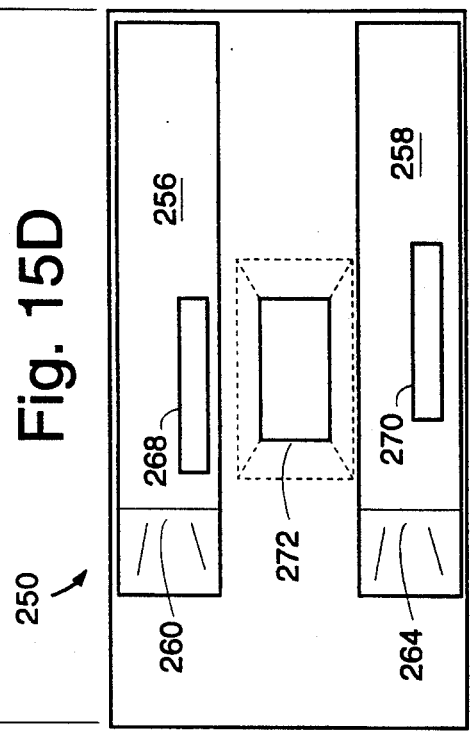
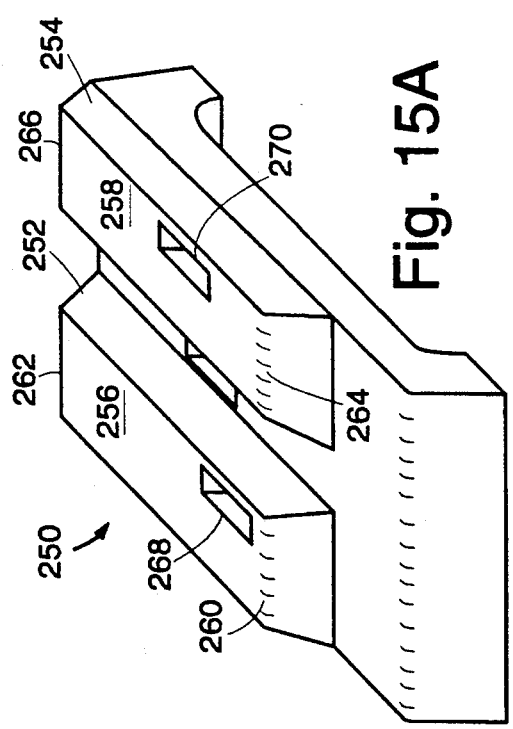

DUAL VERY-HIGH DENSITY MAGNETIC HEAD ASSEMBLY WITH OPTICAL SERVO POSITIONING FOR VERY HIGH DENSITY FLOPPY DISK RECORDING AND HIGH DENSITY FORMAT COMPATABILITY

BACKGROUND OF THE INVENTION

1. Field of the Invention

The present invention relates to magnetic disk drive systems and more particularly to a read/write head having an aperture that allows an optical servo positioning system to read prerecorded patterns on a disk from a point between the rails of the head.

2. Description of the Prior Art

The track density of magnetic storage disks for conventional floppy disk drives is approximately forty-eight to 135 tracks per inch (TPI). In contrast, optical disk drives are capable of achieving track densities in excess of 15,000 TPI. These higher track densities are achieved through the use of closed-loop optical servos that allow a magnetic read/write head to follow data track eccentricities caused by defects in the media and outside disturbances. In rigid type magnetic disk drives, track densities of up to 1500 TPI are presently used. These drives commonly have multiple disks in which both sides are used for data. To achieve a high track density, a dedicated surface of one of the disks is set aside solely for magnetic track servo information This surface is then not usable for data storage. Thus, the total capacity of the drive is lessened. The tracking servo information is also capable of being accidentally erased causing loss of access of all data.

Various techniques have been reported for using optical means for acquiring track following servo information contained on a magnetic recording media. For example, Ahn, et al., in U.S. Pat. No. 4,633,451, issued on Dec. 30, 1986, for "Optical Servo For Magnetic Disks", disclose the use of a laser diode to read track following servo information in the form of a plurality of spots contained in an optical layer positioned above a magnetic recording layer.

DiStefano et al., in U.S. Pat. No. 4,570,191, issued on Feb. 11, 1986, for a optical sensor for servo position control, disclose a servo sensor comprising a light source and a light detector, and which is axially aligned and contained on a single semiconductor chip.

M. Johnson, in U.S. Pat. No. 4,558,383, issued on Dec. 10, 1985, for "Information Storage Disk Transducer Position Control System Using a prerecorded Servo Pattern Requiring No Alignment With the Storage Disk", discloses a servo apparatus having a sensor for detecting a pattern of spots on a surface of an information storage media. The spots comprise a dense array of substantially translation invariant marks and separate information recording tracks are detected by measuring the rate at which the spots are detected by the sensor.

J. Cocke. et al., in U.S. Pat. No. 4,587,579, issued on May 6, 1986, for "System for Position n on a Rotating Disk", disclose a servo control system comprising a detector for reading a plurality of spiral radial-position-encoding patterns on a media.

A. S. Hoagland in "Optical Servo of Magnetic Recording", IBM Technical Disclosure Bulletin, Vol. 20(10), page 4108 (March 1978), suggests a system for achieving optical servo control where a flexible disk media includes a plurality of optical servo tracks positioned underneath a magnetic layer.

D. A. Thompson. et al., in "Embossed Servo Techniques For Floppy Disks", IEEE Conference Proceedings, No. 43, p. 321 (July 1979), suggests the use of embossed marks on flexible magnetic media for obtaining non-magnetic optical or capacitive servo information.

N. Koshino and S. Ogawa in "Optical Method of the Head Positioning in Magnetic Disk Systems", preprint from IEEE Transactions on Magnetics (1980), disclose an optical head for achieving track following servo control which is mounted on the head arm and which includes an LED light source and three optical fibers for delivering light to a media. The media comprises a plurality of circular optical tracks, dyed black, and located underneath a magnetic film.

Related work has occurred in the laser video disk area, from which optical disks for digital data storage and the audio laser compact disk (CD) have evolved. Fundamentally, the optical servo information is inscribed and used in the same way for all these disks. A mastering machine is used to format optical information onto a master disk. The master is then replicated to form the actual disk used by the customer. A laser and associated optics are used to acquire the mastered servo information as well as read data from the disk. The data can be inscribed during the mastering process as with the video and audio disks or it can be written by the read/write laser as in disks for digital information storage.

A disk drive system is needed in which an optical servo sensor is able to access servo information on the surface of a floppy disk between the rails, through a light aperture in the head, where the floppy disk has been stabilized. Extraordinary effort and skill have been needed to reduce the present invention to practice. The prior art was not faced with the extremely high track densities that put such demands on the servo-positioning system that disk ripple outside the head slider becomes a major source of error, which is solved by the present invention. The combination of opposing rails and optical detection at the geometric center between them is key to succeeding at producing a high density magnetic-optical disk.

The problems in the prior art that need to be overcome include those associated with the thermal distortion of conventional media and sliders, variations in media surface finish and lubrication that vary from manufacturer to manufacturer and distortions of the industry standard media that is formed by attaching a metal hub to a MYLAR disk.

SUMMARY OF THE INVENTION

It is therefore an object of the present invention to provide a disk drive system that keeps an illuminated spot in focus for optical servo positioning with a simple and inexpensive optics system.

It is another object of the present invention to provide a disk drive system that is compatible with both 135 TPI 1.44 megabyte and 1251 TPI 20.8 megabyte, or even denser, formats on 3.5 inch microfloppies.

It is further object of the present invention to provide a read/write head that minimizes crosstalk coupling between the upper and lower heads.

It is another object of the present invention to provide a read/write head that stiffens the area of a floppy disk pinched between the sliders of opposing head assemblies so that focusing and detection of optical servo information on the floppy disk may be read with simple optical techniques.

Briefly, a preferred embodiment of the present invention is a disk system comprising an upper and lower head gimbal assembly, a coarse positioning servo system that includes a stepper motor for 135 TPI operation and a voice coil servo for 1251 TPI operation driven by a optical servo system that locates optical information prerecorded on 3.5 inch microfloppies. The optical system focuses a spot of infrared light on the microfloppy which is channeled back to a detector. Each head gimbal includes a ceramic slider with two air bearing surfaces. A very high density magnetic core is positioned in one air bearing surface and high density magnetic core is located in the other air bearing surface. Both upper and lower sliders are such that the floppy disk media is pinched between them. The gaps of the magnetic cores are positioned within the leading edge half of their respective air bearing surfaces and take advantage of the tendency of the sliders to plow into the floppy disk media and increase the range of penetration values that can still maintain contact between the head and media. The very high density and high density cores are offset differently from the centerline of the sliders to reduce crosstalk coupling between heads on opposite sides of the floppy disk media.

An advantage of the present invention is that a system is provided in which the use of expensive dynamic focusing optics systems has been avoided and a reliable optical positioning image is kept in focus on a detector.

Another advantage of the present invention is that the media accessible underneath the head is held relatively rigid by the head.

Another advantage of the present invention is that the reading and writing error between the upper and lower heads is minimized.

Another advantage of the present invention is that a disk drive system capable of recording over twenty megabytes on a 3.5 inch microfloppy can be realized that is simultaneously compatible with industry standard 1.44 megabyte high density microfloppies.

These and other objects and advantages of the present invention will no doubt become obvious to the those of ordinary skill in the art after having read the following detailed description of the preferred embodiment which is illustrated in the various drawing figures.

IN THE DRAWINGS

FIGS. 9A, 9B and 9C are end, side, and bottom (disk media side) views of the sliders that are a part of the carriage assembly of FIG. 6 and head gimbals of FIG. 8;

FIGS. 10A, 10B and 10C are end, side and top views of the magnetic core;

FIG. 11 is a side view of the slider of FIGS. 9A-9C fitted with the magnetic core of FIGS. 10A-10C;

Figure 6:
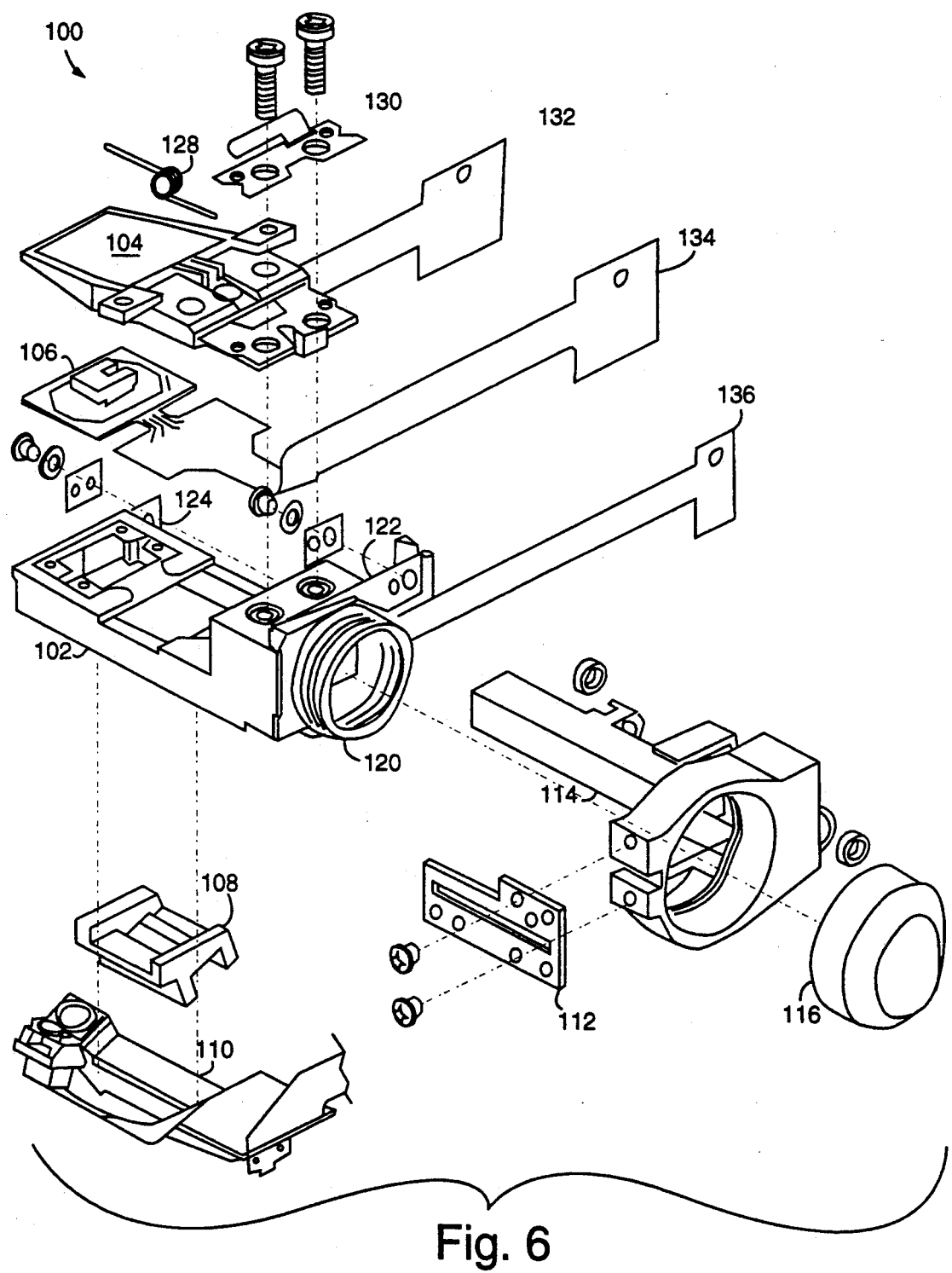
FIG. 6 is a perspective exploded view of a parts assembly for the carriage assembly embodiment of the present invention.

FIGS. 12A and 12B are perspective views of the bottom of the lower mount assembly of the carriage assembly of FIG. 6. FIG. 12A is a view with the LED, lens and mirror removed to show the optics assembly channel. FIG. 12B is a view from the voice coil motor winding end with the detector removed to show the parts behind it unobscured;

FIG. 13 is a perspective view of the optics system shown in its relative position to the lower slider. A beam of infrared light is indicated by the dotted line;

FIG. 14 is an end elevational view of the optics system of FIG. 13 and additionally shows the floppy disk media, the upper slider and the position of the VHD gap axis relative to the spot on the floppy disk media illuminated by the infrared light at the center of detector image on disk; and FIGS. 15A, 15B, 15C and 15D are perspective, end, side and bottom (disk contact surface) views of an alternative slider made according to the present invention.

DETAILED DESCRIPTION OF THE PREFERRED EMBODIMENT

Figure 1:
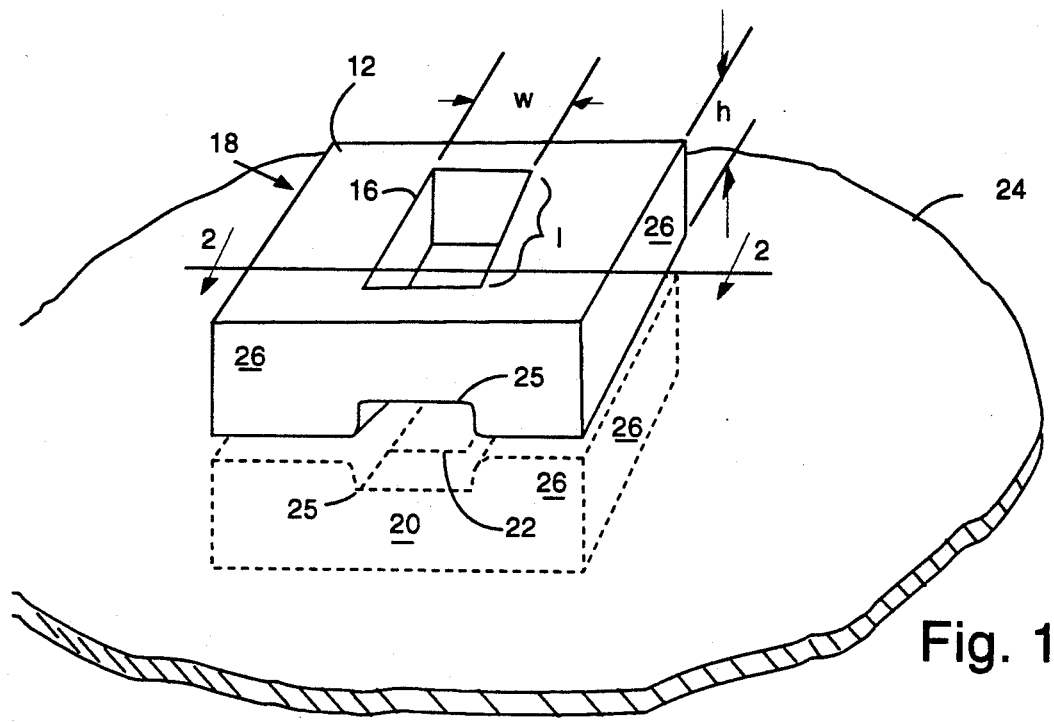
FIG. 1 is a perspective view of a pair of read/write head sliders according to the present invention which are shown loaded on a cutout section of a magnetic disk.

FIG. 1 shows an upper read/write head slider 12 for an information storage device disk drive system containing a centrally located aperture 16. The information storage device could be, for example, the flexible disk drive of a microcomputer. The configuration of the read/write head 12 containing the aperture 16 is referred to as a hole-in-the-head configuration 18. A lower read/write head slider 20 which can include a lower head aperture 22 is positioned on the opposite side of a recording media 24 from the upper head 12. In the preferred embodiment, the aperture 16 is centered around the approximate geometric center of the head 12 and extends completely through a width "h" of the head 12 thus providing a passageway between the upper and lower faces of the head 12 to the recording media 24 at a location within the outer perimeter of the head 12. The shape of the aperture 16 is shown as being rectangular, but this shape is irrelevant and any other geometric shape, e.g. a circle or triangle or an irregular shape would suffice. The rectangular aperture 16 has a length "1" and a width "w". The width "h" of the head 12 is also the height of the aperture 16. Typically, "1" is approximately 0.140 inches, "w" is approximately 0.050 inches and "h" is approximately 0.060 inches. A plurality of notches 25 may be located on a plurality of faces 26 of the upper and lower heads 12 or 20 which do not include the apertures 16 or 22.

The lower read/write head 20 is substantially identical to the upper head 12 and may contain the lower head aperture 22. It should be noted that in some disk drive systems, the heads 12 and 20 are "read only" heads or "write only" heads. For purposes of the present invention, it is irrelevant if the read/write heads 12 and 20 perform both the read and write function (e.g., a dual function head) or only one of these functions (e.g., a single function head). Hereafter, it should be understood that the word "head" refers to both single function and dual function heads. Additionally, it is not essential that the lower head 20 include the aperture 22. In the preferred embodiment, the media 24 is a magnetic media such as a flexible or hard magnetic disk as in floppy and Winchester disks. With a magnetic media, the heads 12 and 20 must be magnetic read/write heads.

Figure 2:
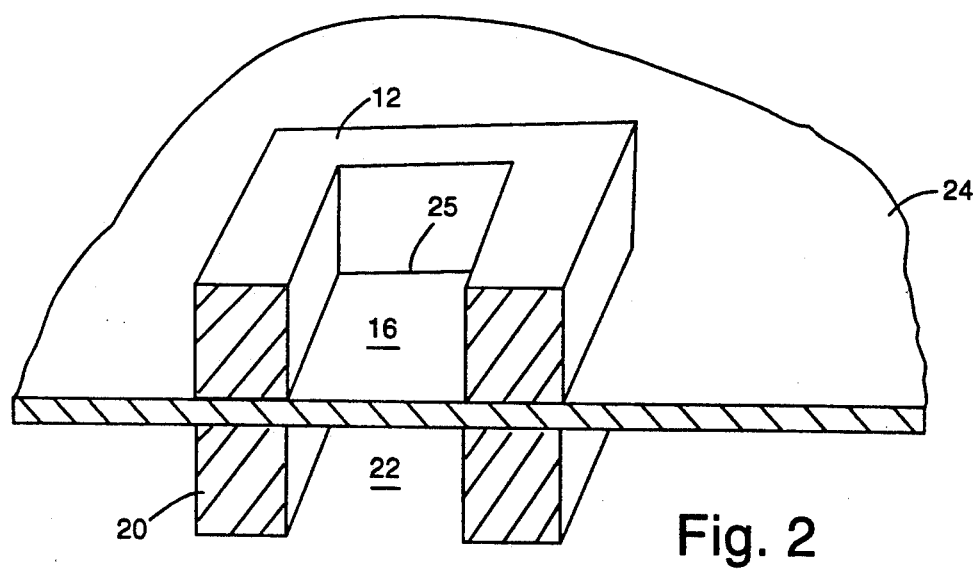
FIG. 2 is a cross-sectional view and perspective of the read/write head sliders of FIG. 1 taken along the line 2—2.

FIG. 2 shows a cross-sectional view of the heads 12 and 20 taken along the line 2—2 of FIG. 1. The apertures 16 and 22 provide a location for viewing the surface of the media 24 that is otherwise obscured by the heads 12 and 20. Various optical or electrical components can be positioned in or near the apertures 16 and 22.

Figure 3:
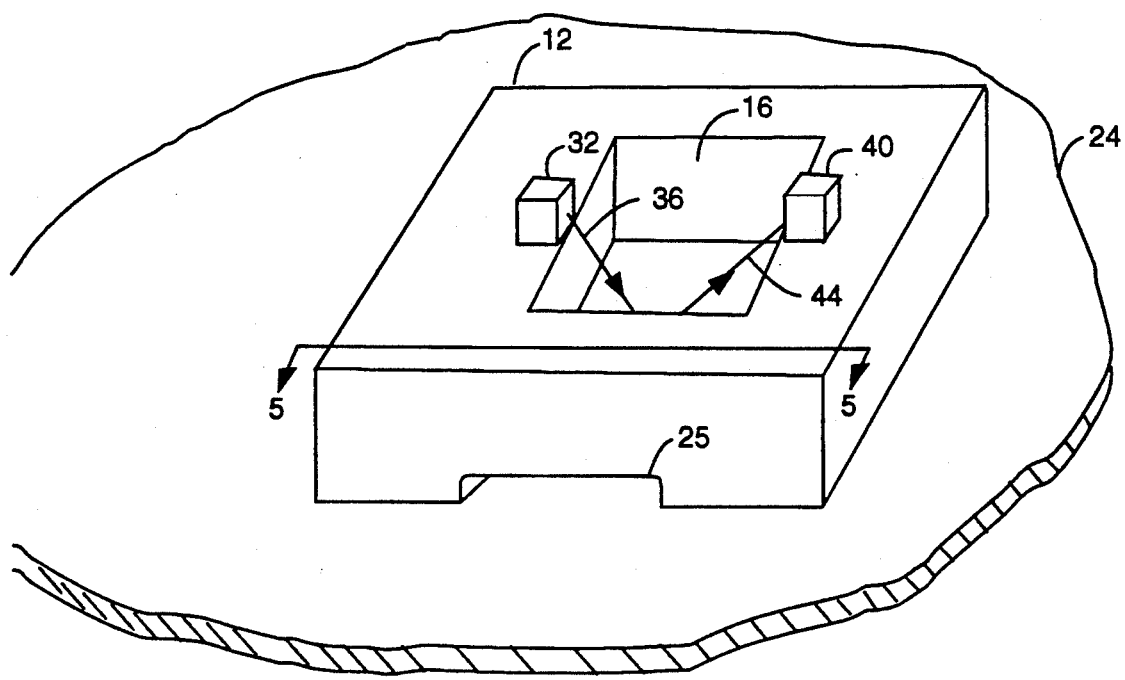
FIG. 3 is a perspective view of the upper read/write head slider of FIG. 1 with the addition of a light source and detector that read optical information off the surface of the disk rotating below the center aperture in the slider.

For example, FIG. 3 shows a light source 32, such as a light emitting diode or a laser, positioned to direct a beam of light 36 into aperture 16. A detector 40 is positioned to receive a reflected beam of light 44 that returned from an illuminated spot on the surface of the media 24. The amount of light returned is a function of the surface reflectivity of media 24. Patterns that affect the surface reflectivity are put on media 24 to encode optical servo positioning information that is ultimately used by a servo system to position heads 12 and 20 on media 24.

In FIG. 1, where both the upper head 12 and the lower head 20 include respective apertures, light source 32 may be positioned to direct a beam of light through aperture 16 to illuminate a spot on media 24. If media 24 is light transmissive, either transparent or translucent, light which is affected by optical patterns on media 24 will be received through aperture 22 by a detector, similar to detector 40, that is located on the same side of media 24 as is lower head 20. Therefore, the detector is capable of reading optical servo information that has been previously encoded on media 24 and illuminated by the spot of light.

Figure 4:
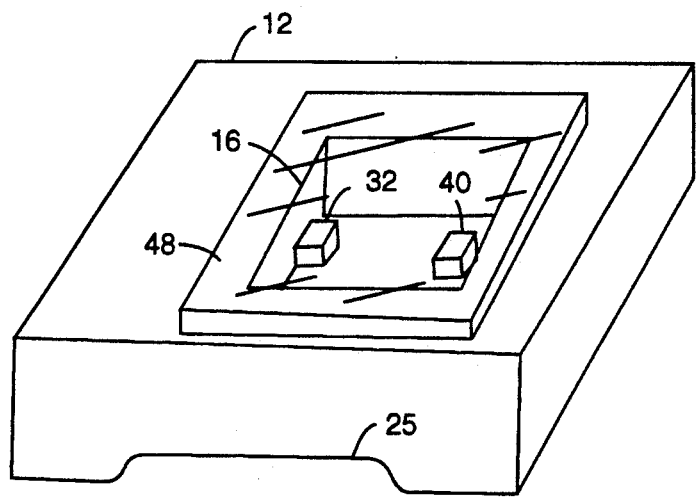
FIG. 4 is a perspective view of the read/write head slider with the light source and detector placed within the aperture under a cover.

FIG. 4 shows that the light source 32 and the detector 40 may also be positioned within head 12 at a location inside the aperture 16. A cover 48 is used to block extraneous light from aperture 16, and it can be made from a separate piece of material that covers or fits inside aperture 16. Alternatively, cover 48 may be an integral part of the head 12 which essentially prevents the aperture 16 from extending completely through the width "h" of the head 12. Additionally, other optical components, such as fiber optic cables and lenses, or other electrical components, such as a capacitance measuring devices, can be located in or around the aperture 16.

The light source 32 and the detector 40 enable the reading of servo-tracking information prerecorded on the surface of media 24. In this application, the hole-in-the-head configuration 18 provides several advantageous features.

Figure 5:
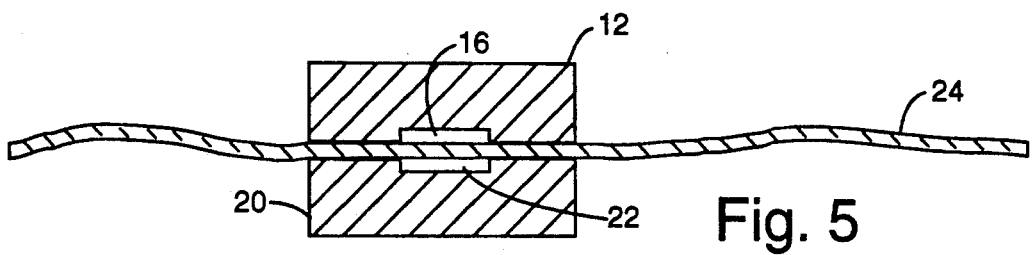
FIG. 5 is a cross-sectional view of the read/write head sliders and floppy disk media of FIG. 3 taken along the line 5—5. Waves and warping within the floppy disk media is brought under control and substantially eliminated as a source of error in the area pinched between the opposing adjacent slider rails surrounding the central apertures.

First, the surface of the media 24 that is exposed by the aperture 16 is held relatively flat by the head 12, as illustrated in FIG. 5. For a floppy disk drive, the media 24 is held flat. One head, e.g. head 12, is rigidly fixed, the other head, e.g. head 20, is allowed to comply to the fixed head. A load $P_1$ is applied to head 20, thus pinching the media 24 between the two heads. In a Winchester drive, the media is rigid and it is the heads that are loaded and made to comply to the media. Keeping media 24 flat where optical servo information is read from media 24 is important because it allows the distance between media 24 and the optic or capacitive devices located around the aperture 16 to be fixed and eliminates the need for a dynamic focusing mechanism of some type. This is important where the depth of focus of the optical system is very limited, as it is in the present case. The surface of the media 24 outside the head 12 is free to vibrate or deform, which is particularly true with flexible magnetic media used in microfloppies. (A discussion of this phenomenon is provided by C. Dennis Mee, et al., in *Magnetic Recording Technology*, Vol. 1, McGraw-Hill, 1987, FIG. 7.11 and associated pages.)

Second, without aperture 16, the surface of media 24 overshadowed by head 12 is neither visible nor accessible.

Third, when the upper and lower heads 12 and 20 are used, the surface of the media 24 exposed by the apertures 16 and 22 is at the geometric center point between the upper and lower heads 12 and 20. This means that if distortions occur in the media 24 they are minimized by the configuration 18. For example, if thermal or hygroscopic expansion of the media 24 occurs, the offset from the upper head 12 to servo tracking information on the surface of the media 24 is equal to the corresponding offset between the lower head 20 and the servo tracking information.

Fourth, the hole-in-the-head configuration 18 maximizes the amount of media surface area usable for information writing. If the light source 32 and detector 40 are located outside the head 12, extra media surface area would be required for writing servo information.

The apertures 16 and 22 may be prepared by several methods. For example, a precision drill may be used to drill a hole in an assembled head. Alternatively the pieces of an unassembled head may be designed so that the apertures 16 and 22 would be part of the assembled head configuration.

FIG. 6 illustrates a dual-head carriage assembly 100 for recording on both sides of a floppy disk media. Carriage assembly 100 comprises a lower mount assembly 102, an upper arm assembly 104, a lower head flex assembly 106, an optics holder 108, an optics assembly 110, a gear rack assembly 112, a zinc base carriage 114, a voice coil motor magnet 116 and a voice coil motor winding 120. A pair of flat springs 122 and 124 suspend lower mount assembly 102 from base carriage 114 such that a voice coil motor comprised of magnet 116 and winding 120 is able to move lower mount assembly 102 back and forth approximately thirty mils, relative to base carriage 114. A stepper motor and gear assembly (not shown) that engages gear rack 112 and which is able to move carriage assembly 100 back and forth across the whole data recording area of a typical 3.5 inch microfloppy. The stepper motor provides positioning for coarse adjustments needed for high density (HD) recordings and the voice coil motor provides fine positioning for very high density (VHD) recordings. A flat flex hinge 126 allows a pivoting attachment of upper arm assembly 104 to lower mount assembly 102. A spring 128 causes a pinching action that serves to engage the floppy disk media when inserted between upper arm assembly 104 and lower mount assembly 102. An arm spring mount 130 holds spring 128 in place. A flex circuit 132 provides flexible connection of upper arm assembly 104 to a read/write controller. A flex circuit 134 provides flexible connection of lower head flex assembly 106 to the read/write controller. A flex circuit 136 provides flexible connection of voice coil motor winding 120 to a servo controller.

Figure 7A:
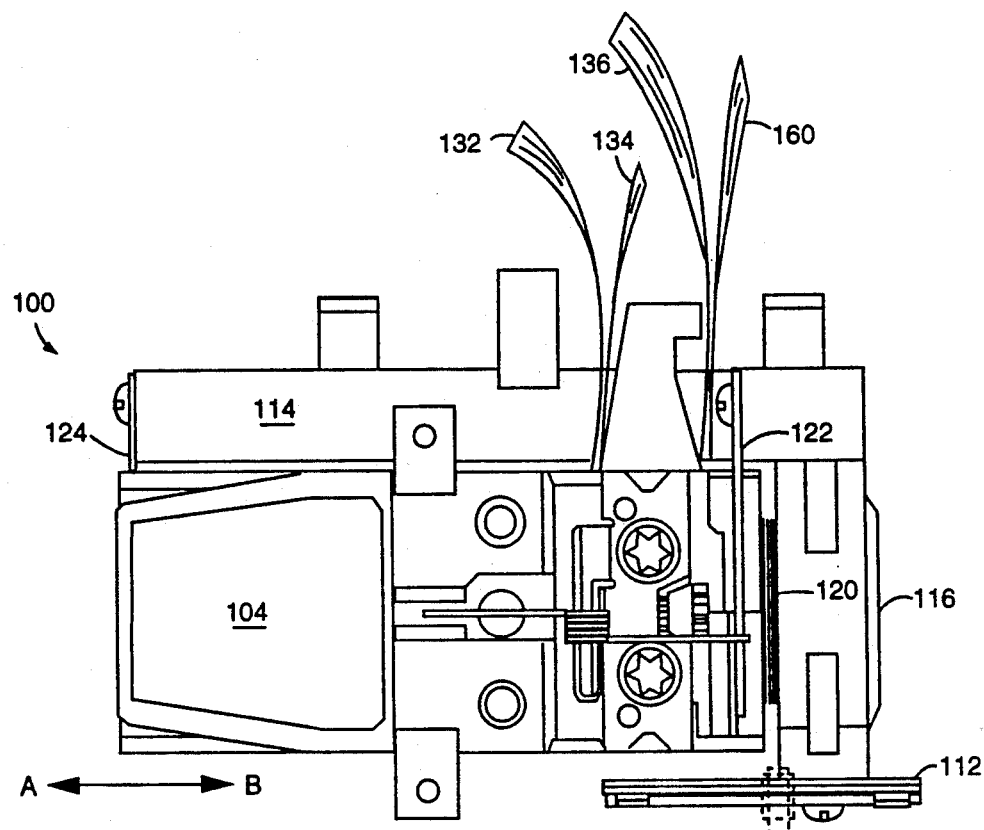
FIGS. 7A, 7B and 7C are top, side and end views, respectively, of the carriage assembly of FIG. 6. A phantom view of the stepper motor is shown in FIG. 7A only to allow the other components to be shown more clearly.
Figure 7B:
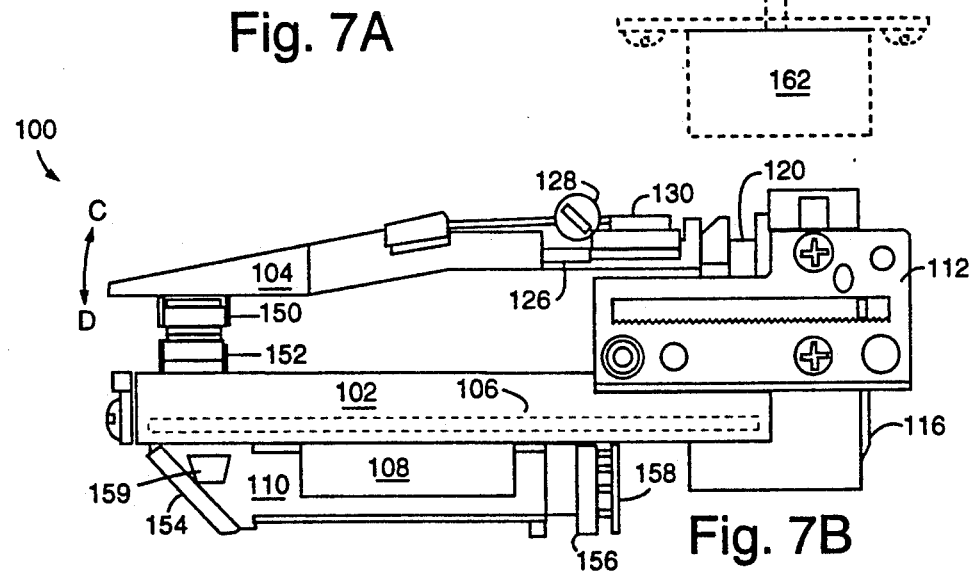
Figure 7C:
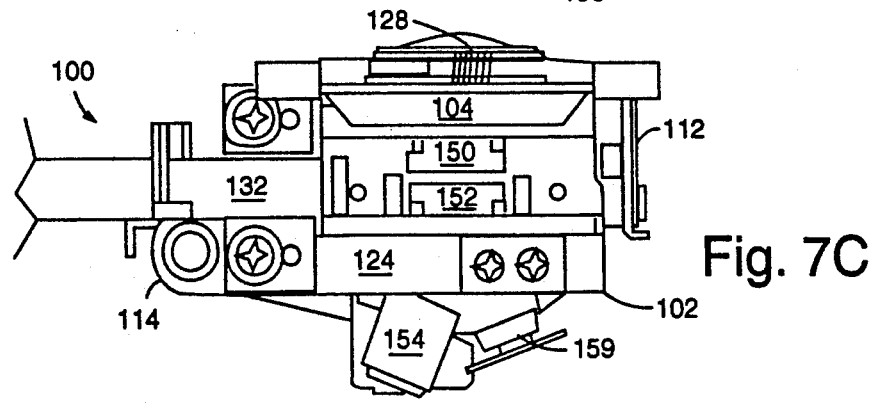

FIGS. 7A, 7B and 7C show that an upper head gimbal assembly 150 and a lower head gimbal assembly 152 are respectively mounted to upper arm assembly 104 and to lower flex assembly 106. A mirror 154 is situated to reflect infrared light coming from the floppy disk media through lower head gimbal 152. Mirror 154 is preferably a sheet of glass with a dielectric coating that is approximately 99% reflective at 875 nanometers. Aluminum coated mirrors are too lossey at infrared wavelengths. Other metallic coatings require a second coating to prevent oxidation that also increases costs.

The reflected light from an illuminated spot on the floppy disk media travels down a channel within optics assembly 110 to an infrared photo detector 156 connected to a flex circuit 158. The light is emitted from an infrared (IR) light emitting diode (LED) 159 mounted on optics assembly 110 next to mirror 154. LED 159 produces a spot of IR light on the floppy disk media. A flex circuit 160 and flex circuit 158 connect to an optics circuit (not shown) that is contained within lower mount assembly 102. FIG. 7A shows a stepper motor 162 engaged with gear rack 112 that moves zinc base carriage 114 back and forth in directions "A" and "B". In FIG. 7B, upper arm assembly 104 can pivot out in a direction "C" on hinge 126. Spring 128 forces upper arm assembly 104 to pivot back in a direction "D".

Figure 8:
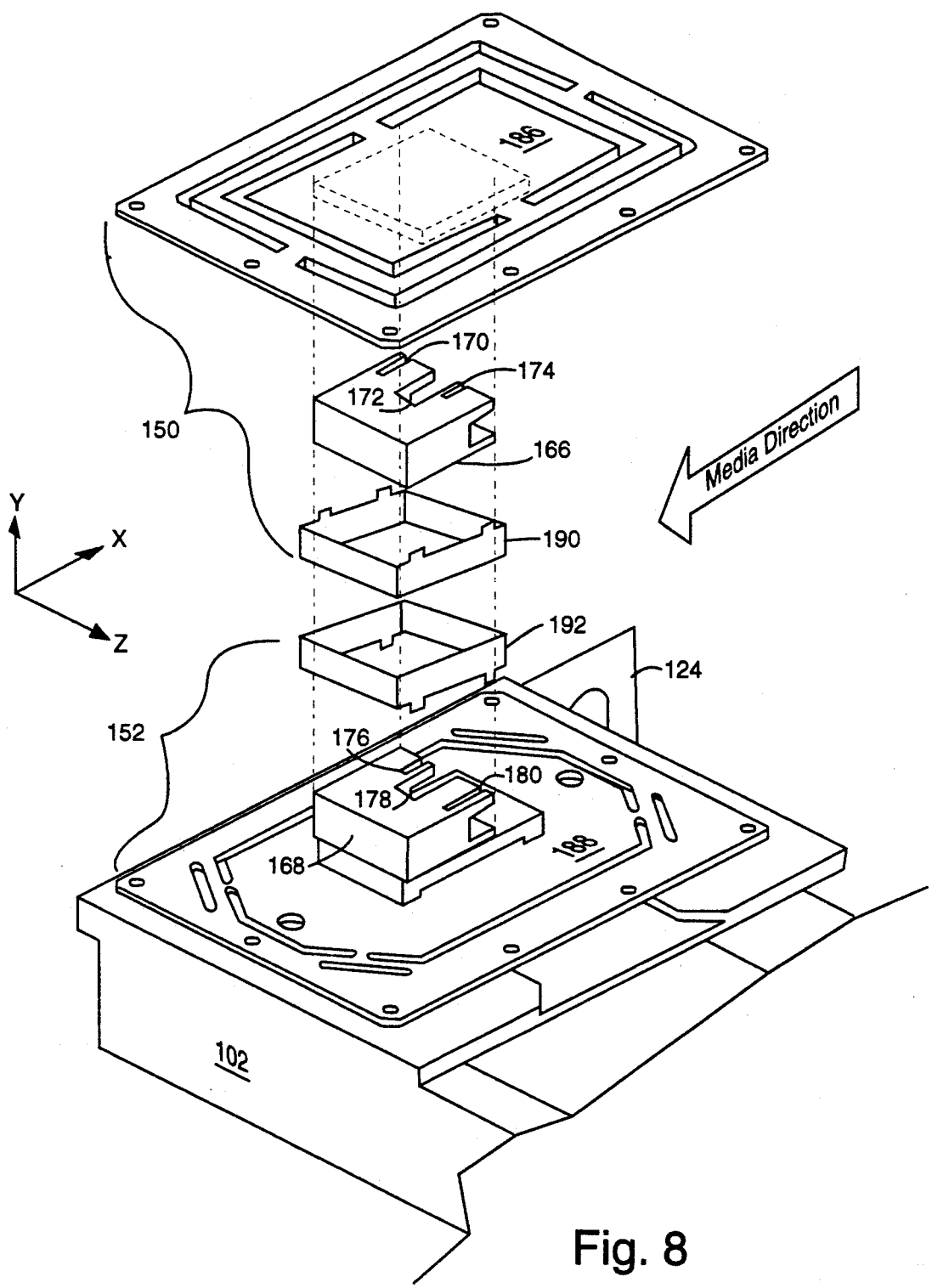
FIG. 8 is a perspective view of the upper and lower head gimbal assembly of the carriage assembly of FIG. 6.

FIG. 8 illustrates the alignment of upper head gimbal assembly 150 and lower head gimbal assembly 152 are such that they match perimeters on opposites sides of a floppy disk media (not shown) that may be pinched between them. Upper head gimbal assembly 150 and lower head gimbal assembly 152 separate in a direction "Y" in order to load the floppy disk media, and move back and forth in a direction "Z" and a direction opposite to "Z" ("−Z") in order to seek data tracks on the floppy disk media. Upper head gimbal assembly 150 and a lower head gimbal assembly 152 respectively comprise upper slider 166 and lower slider 168 which are made of ceramic. Sliders 166 and 168 move in a direction "X", relative to the spinning floppy disk media. Slider 166 has a very high density (VHD) slot 170, an optics slot 172 and a high density (HD) slot 174 all on its leading edge. Slider 168 has a high density (HD) slot 176, an optics slot 178 and a very high density (VHD) slot 180 all on its leading edge. Magnetic cores suitable for recording and reading HD formats (135 TPI, 1.44 megabyte/disk) are low temperature glass bonded into slots 174 and 176. Magnetic cores suitable for recording and reading VHD formats (1251 TPI, 20.8 megabyte/disk) are low-temperature glass-bonded into slots 170 and 180. Slots 172 and 178 straddle the centerlines in direction "X" that pass through sliders 166 and 168, respectively. VHD slots 170 and 180 are offset from their respective centerlines more than are HD slots 174 and 176 to prevent a direct alignment and resulting coupling between the magnetic cores held in place by slots 170 and 176 and also slots 174 and 180. The offset of VHD slots 170 and 180 is approximately 1.250 millimeters (mm). The offset of HD slots 174 and 176 is approximately 0.75 mm. Slots 174 and 176 are a bit deeper cut into the leading edge of sliders 166 and 168 so that the VHD core gaps are set back approximately 0.350 mm from those of the HD core gaps in slots 170 and 180. This setback gives the cores a circumferential offset that reduces crosstalk coupling between the HD and VHD cores and puts the HD core in a position that suits relevant American Nation Standards Institute (ANSI) specifications. The HD and VHD gaps allow the HD gap to be placed optimally for compatibility with the industry standard 1.44 megabyte format diskettes and the VHD gap to be placed to minimize errors in the track following servo as the carriage travels between inner and outer radius data tracks.

Sliders 166 and 168 preferably comprise calcium titanate. If all three slots were to be simultaneously ground into the sliders they would crack. Therefore, to open up the various slots it is preferable to grind slots 170, 174, 176 and 180 first. Appropriate magnetic cores are then glass bonded into their respective positions. After which, center (optics) slots 174 and 178 are ground. The glass bonded cores afford the sliders enough strength to withstand the grinding forces without breaking.

When a magnetic circuit reads flux changes recorded in a floppy disk media, it transmits a reflected signal. If two cores are close enough to each other, they can interfere with one another. In standard 135 track per inch (TPI) disk drives, the cores are separated by 1.5 mm radially and 0.075 mm vertically, which is the thickness of the disk. This separation is enough to reduce crosstalk to the point it is no longer significant.

One embodiment of the present invention has a variable mode to accommodate both 1251 TPI and 135 TPI disk formats in the same drive. (20.8 megabyte and 1.44 megabyte modes, respectively.) In the simplest case, such a drive will experience crosstalk if the magnetic cores are too close, and the HD core used for the 135 TPI tracks will have a five fold amplification effect caused by its larger track width (0.125 mm versus 0.0155 mm). The following two techniques could eliminate such crosstalk problems. First, a shield can be placed in the ceramic housing to redirect the transmitted field. Such shields are glass bonded in the housing, but thermal distortion caused by the dissimilar materials used prevents maintaining a flatness specification of ±two microinches. Second, the crosstalk signal can be electrically subtracted. An attenuated signal from the HD core is subtracted from the affected VHD core. However, read channel complexity adds cost and uses circuit board real estate that is at a premium. The proper level of the attenuated signal is not easy to gauge, and the right level can vary from drive to drive in manufacturing. The different offsets for HD and VHD cores, as described herein for slots 170, 174, 176 and 180, is an effective way to reduce crosstalk that is consistent from drive to drive, and is simple to implement. The offset of the HD core, in slots 174 and 176, is dictated by industry practice for 135 TPI type drives. The offset for the VHD cores, in slots 170 and 180, has been empirically determined to yield acceptable crosstalk coupling levels when the radial offset between cores is approximately twenty mils and the circumferential offset is fourteen mils.

The leading edges of sliders 166 and 168 are configured to plow into the floppy disk media to maintain as much as practical a zero air bearing surface contact between the magnetic cores in the leading edge slots and the floppy disk media during operation. A friction force between the media and the sliders generates a moment that increases the contact. The applied load between the sliders is applied forward of center to increase the contact pressure in the gap regions. Sliders 166 and 168 are respectively mounted to head flexures 186 and 188, which are sometimes referred to as flex gimbals by those skilled in the art. Upper head flexure 186 has slots opened up in it and is two mils thick to allow slider 166 to be compliant. Lower head flexure 188 has slots opened up in it and is eight mils thick to prevent "oil canning", or mechanical popping of the support under slider 168 with temperature changes.

A pair of ring shields 190 and 192 are bonded to head flexures 186 and 188 such that they surround sliders 166 and 168 and protect against spurious electrical hum from being induced into the magnetic cores from nearby sources. The bonding is done at the four corners of ring shields 190 and 192 with epoxy applied to respective extensions or feet. Three of the feet are typically bonded with non-conductive epoxy to benefit from the strength of such epoxy, and the fourth foot is bonded with conductive epoxy to electrically ground the ring shield to its respective flexure. Sliders 166 and 168, with their associated ring shields 190 and 192, must be large enough so that the sliders can accommodate the necessary magnetic cores and optics, and at the same time small enough to fit within the window opening of standard 3.5 inch microfloppy disks. This places constraints on the material thickness allowable for ring shields 190 and 192. In one embodiment of the present invention, the ring shields 190 and 192 have outside dimensions of 6.10 mm ("X") by 4.10 mm ("Z") and are 1.70 mm ("Y") tall, including the foot extensions. The material used for ring shields 190 and 192 is preferably a high permeability Mu shield foil stock, 0.15 mm thick and bent, not stamped into shape, to prevent curling that takes up valuable space. A hydrogen oven is used to increase the minimum permeability of the shield foil stock to 60,000 at B-40. The heat treatment may comprise a dry hydrogen soak for one hour at 760° C. and a slow cooling off at a rate of 177° C. per hour to 93° C.

A low impedance path of less than ten ohms is needed from the head flexures 186 and 188 to an analog ground (AGND). The base casting and chassis should be isolated from AGND. The grounding of the head arm assembly (HAA) is made through the associated flex circuit. The magnetic preamp on the head flex assembly is grounded to AGND through the flex circuit. The upper arm fixture is grounded to AGND with a pin to the hole on the upper magnetic flex circuit. The head flexure is grounded to AGND on the flex circuit with conductive epoxy. The base casting and chassis are not directly grounded, but are AC grounded with a capacitor to AGND. The carriage assembly parts may be made of conductive plastic to minimize static electricity buildup. The use of conductive plastic provides a relatively high impedance path from the chassis to AGND through the head flexures 186 and 188 and flex circuits 132 and 134. Using aluminum for the base carriage and lower mount assembly 102 will change the grounding system. The chassis will be grounded to AGND through a low impedance path with the lower head flexure 188 attached to the lower mount 102 and base carriage 114. The impedance from the head flexure 188 to the AGND in flex circuit 134 may vary from drive to drive depending on the quality of the epoxy bonding between the head flexure 188 and flex circuit 134.

FIGS. 9A, 9B and 9C illustrate slider 166, which is similar to slider 168. (The cores and associated coils are not shown so that the details of the sliders are more apparent). A slot 200, which is a lateral opening across the leading edge face of slider 166, provides clearance for coils that are wound on magnetic cores that are fixed within slots 170 and 174. A leading edge blend 202 provides a smooth transition of orthogonal vertical and horizontal surfaces on slider 166. A trailing edge blend 204 does the same. Blend 202 is preferably 125 micrometers ($\mu$m)±fifty $\mu$m. Blend 204 is one hundred $\mu$m wide and twenty-five $\mu$m deep. A pair of air bearing surfaces (ABS) 206 and 208 are flat, elongated mesa tops created by the various blends. ABS 206 and 208 are what is typically referred to by those in the art as rails, and are the more or less parallel surfaces of slider 166 that contact the floppy disk media. ABS 206 and 208 are each approximately one mm wide and four mm long and are flat and coplanar to within two microinches. These dimensions have been observed to produce improved penetration ranges and were less sensitive to pitch.

Head loading is preferably nineteen grams minimum, with the load point off-center towards the leading edge of slider 166 by 0.35 mm. The position of the head load point affects signal amplitude and modulation. Penetration of the head in the drive is preferably set to zero-±one mil. Pitch and roll of the head in the drive are set to ±0.25 degrees.

A very high density (VHD) magnetic core 210 is illustrated in FIGS. 10A, 10B and 10C. VHD core 210 comprises an "I" section 212 and a "C" section 214. A radius 216 narrows the width of core 210 that ultimately comes in contact with the floppy disk media. At one junction of sections 212 and 214 is a magnetic gap 218. Core 210 is bonded into slot 170 with a low temperature glass process such that material fills in around radius 216 and bridges the gap created by slot 170 in ABS 206. A second core, for high density recording, is similar to core 210 and bonds into slot 174.

Erasure of high density, 135 TPI tracks is described in the present inventors' co-pending application, Ser. No. 07/424,667, filed Oct. 20, 1989, now abandoned, and is incorporated herein by reference. A single erase at track center is all that is needed for very high density, 1251 TPI tracks, because the optical servo positioning system will keep core 210 in position over even elliptical tracks caused by temperature effects.

FIG. 11 shows core 210 mounted within slider 166 and wound with a coil 220. In one embodiment of the present invention, coil 220 comprises thirty to fifty turns of 48-50 AWG heavy build bifilar wire with the start and finish kept away from ABS 206 such that center 172 is kept clear of wire. When two coils are to be placed in close proximity to one another, they can be wound in opposite directions to reduce mutual coupling.

FIGS. 12A and 12B show the position of a light channel 230 that runs down the center of optics assembly 110 that allows light reflected by mirror 154 to reach detector 156. Light channel 230 also acts to restrict spurious and ambient light from reaching detector 156. A baffle may be placed within channel 230 to further restrict light reaching detector 156 to that which has been originated from LED 159 and reflected directly from the surface of the floppy disk media. Such a baffle may be implemented by threading the inside cylinder of channel 230 with a standard screw thread. This will prevent spurious light reflections on the inside walls of channel 230 from disturbing the operation of detector 156.

In FIG. 13, the infrared light emitted by LED 159 is represented as passing through center slot 178 in slider 168 and bouncing back off a floppy disk media (see FIG. 14) engaged by slider 168. The return light is magnified by a lens 232 and reflected by mirror 154 down channel 230 where it is received by detector 156. The magnification resulting from the combination of lens 232 and the length of the path from lens 232 and detector 156 is approximately four to five times, and this helps to improve the performance of the overall optical servo system. Such an optics system keeps an illuminated spot on the floppy disk media in focus without having to resort to a more complex and expensive solution, e.g., one that uses a voice coil to keep a dynamic focus as the media spins and wobbles up and down. The fact that the optics assembly 110, LED 159 and lower flex assembly 106 are all fixed together and ride on lower mount 102 locks-in the focus, because upper head gimbal assembly 150 presses the floppy disk media down to meet lower head gimbal assembly 152.

The angle of incidence of the infrared light, shown in FIG. 14 as an angle "E", is preferably 70°±0.25°, from direction "X" (FIG. 8) and "−X" toward direction "Y". The incidence of light is normal to direction "Z". Higher angles are limited by the relative sizes of optics assembly 110 and LED 159. Higher angles in plane XY could be accommodated by integrating both an LED and semiconductor light detector on a common substrate so that the distance between the light source and sensor are minimized. Lower angles are restricted by the dimensions of slot 178. An optical pattern placed on the floppy disk media is a sequence of reflective and non-reflective areas that produce a twenty kilohertz signal in detector 156 when the floppy disk media is spinning at its normal operational speed. The twenty kilohertz signal is filtered and line frequency interference is easily removed. Typical patterns are described in more detail in U.S. Pat. No. 4,935,835, issued Jun. 19, 1990 to the present inventors and is incorporated by reference herein. Infrared LEDs and detectors in the 800 to 950 nanometer wavelength range are preferred over visible light types because LEDs with peak outputs in the infrared range are very efficient and inexpensive, due to the popularity of their use in handheld remote control units for home televisions. Silicon detectors made of gallium arsenide (GaAs) have detection peaks just shorter than 900 nanometers, and are also inexpensive and widely available, and therefore desirable for use as detector 156. The center of the detector image on disk is 0.10 mm±0.04 mm of the VHD gap axis (VHD gap 218, FIG. 10B). Detector 156 is within the image plane of the pattern on disk setup by lens 232.

FIGS. 15A-15D illustrate an alternative slider 250 which includes a pair of rails 252 and 254 with a substantially parallel pair of air bearing surfaces (ABS) 256 and 258. Rail 252 and ABS 256 have a leading edge 260 and a trailing edge 262. Rail 254 and ABS 258 have a leading edge 264 and a trailing edge 266. A pair of slots 268 and 270 are provided to receive magnetic cores that typically operate at substantially different recording densities and formats. A central aperture 272, is located between rails 252 and 254 and allows a beam of light to pass through aperture 272 to or from an illuminated spot on a floppy disk media pressed flat by ABS 256 and 258. Aperture 272 has slanting side walls, for example it is roughly conical or trapezoidal in shape to minimize the material of slider 250 that must be removed to allow the optical servo positioning system to function properly. Slider 250 is operated such that leading edges 260 and 264 encounter points on a spinning floppy disk media before the trailing edges 262 and 266. Slots 268 and 270 are nearer to respective leading edges 260 and 264 than they are to trailing edges 262 and 266.

The central apertures 16, 22, 172, 176 and 272 do not necessarily need to be open voids in their respective sliders. The apertures may be filled with a solid material, such as glass, that will conduct light to and from the surface of the floppy disk media at a midpoint between the rails.

In an alternative embodiment of the present invention, the IR detector itself, for example a silicon detector chip, may be glass bonded or epoxied into the aperture of the fixed head (e.g., slider 168) and the IR LED similarly mounted in the aperture of the compliant head (e.g., slider 166). The detector must be close enough to be in the optical object plane and within the range of focus to receive a clear image of the prerecorded optical servo patterns on the floppy disk media.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

We claim:

1. A dual-head carriage assembly for recording on both sides of a floppy disk media, the assembly comprising:
   a lower mount assembly;
   an upper arm assembly;
   a lower head flex assembly with an aperture between a pair of rails wherein a pattern on the floppy disk media may be illuminated and imaged between said rails;
   an optics assembly for illuminating and imaging said pattern on the floppy disk media;
   a base carriage;
   a gear rack assembly attached to the base carriage;
   a voice coil motor for acting between the lower mount assembly and the base carriage;
   a pair of flat springs for suspending the lower mount assembly from base carriage such that the voice coil motor is able to move the lower mount assembly back and forth approximately thirty mils, relative to the base carriage;
   a stepper motor and gear assembly that engages the gear rack assembly and which is able to move the carriage assembly back and forth across the data recording area of the floppy disk media, wherein the stepper motor provides positioning for coarse adjustments needed for high density (HD) recordings and the voice coil motor provides fine positioning for very high density (VHD) recordings based on said imaged pattern;
   a flat flex hinge that allows a pivoting attachment of the upper arm assembly to the lower mount assembly; and
   a spring for producing a pinching action that serves to engage the floppy disk media when inserted between the upper arm assembly and the lower mount assembly.

2. A disk drive system, comprising:
- slider means for stabilizing an area of a spinning floppy disk proximate to a magnetic core;
- infrared light means for illuminating a spot of light on said stabilized area;
- optical means for focusing an image of said illuminated spot on an infrared detector and comprises a lens and a channel for establishing an optical image plane at said infrared detector that magnifies said illuminated spot; and
- a threaded surface within said channel that inhibits light that would otherwise bounce off the inside walls of said channel that reach said infrared detector.

3. A magnetic recording head assembly for use with an optical positioning servo system in a microfloppy disk drive, the assembly comprising:
- a flat metallic gimbal relieved of metal around its perimeter;
- a ceramic slider including a pair of substantially parallel air bearing surfaces having a leading edge half and a trailing edge half, the ceramic slider mounted to the gimbal;
- at least one magnetic core disposed within the slider and proximate to said leading edge half;
- means for allowing light to pass between said air bearing surfaces wherein an optical servo system may read prerecorded optical servo positioning information from a microfloppy disk in contact with the slider; and
- a high permeability metal ring shield comprising a mixture of conductive and non-conductive epoxy bonds between the ring shield and gimbal that electrically connect the ring shield and gimbal together and attached to the gimbal and fencing-in the slider wherein the induction of spurious electrical noise in the magnetic core(s) is reduced.

4. A head assembly for a dual headed disk drive system, comprising:
- a first head having a first pair of two parallel rails for riding a first surface of a flexible magnetic disk on a first surface of the first head in a ski-like manner, said first pair of rails being joined together at respective ends by first and second bridges that each have a notch that spans between said first pair of rails on said first head surface and forming an opening between them;
- a second head having a second pair of two parallel rails for riding a second surface of said flexible magnetic disk on a first surface of the second head in a ski-like manner, said second pair of rails joined together and forming a notch spanning between said second pair of rails on said first surface of the second head, said second pair of rails being positioned to pinch said flexible magnetic disk from the opposite side of said first pair of rails to hold said disk relatively rigid between said first and second pair of rails;
- a light source for directing a beam of light through said opening in the first head for reflection of a reflected beam from a point of reflection on said flexible magnetic disk, said reflected beam of light containing optical servo-positioning information recorded on said flexible magnetic disk from a point that passes under the geometric center of the first head; and
- a detector for receiving said reflected beam of light, wherein said opening formed by the first head is approximately 140 mils between said first and second bridges, 50 mils between said first and second pair of rails, and 60 mils from the bottom of each rail on said first surface of the first head.

* * * * *